United States Patent
Burns

(10) Patent No.: US 9,472,238 B2
(45) Date of Patent: Oct. 18, 2016

(54) SYSTEMS AND METHODS FOR LINKED MOBILE DEVICE CONTENT GENERATION

(71) Applicant: Panopto, Inc., Seattle, WA (US)

(72) Inventor: Eric Burns, Seattle, WA (US)

(73) Assignee: Panopto, Inc., Seattle, WA (US)

(*) Notice: Subject to any disclaimer, the term of this patent is extended or adjusted under 35 U.S.C. 154(b) by 0 days.

(21) Appl. No.: 14/634,939

(22) Filed: Mar. 2, 2015

(65) Prior Publication Data

US 2015/0264272 A1 Sep. 17, 2015

Related U.S. Application Data

(60) Provisional application No. 61/952,215, filed on Mar. 13, 2014.

(51) Int. Cl.

| | |
|---|---|
| H04N 5/932 | (2006.01) |
| G11B 27/031 | (2006.01) |
| G11B 27/10 | (2006.01) |
| H04N 5/77 | (2006.01) |
| H04N 21/414 | (2011.01) |
| H04N 21/472 | (2011.01) |
| H04N 21/854 | (2011.01) |
| H04N 21/8547 | (2011.01) |

(52) U.S. Cl.
CPC ............ *G11B 27/031* (2013.01); *G11B 27/10* (2013.01); *H04N 5/77* (2013.01); *H04N 21/41407* (2013.01); *H04N 21/47205* (2013.01); *H04N 21/854* (2013.01); *H04N 21/8547* (2013.01)

(58) Field of Classification Search
CPC .............. H04N 21/41407; H04N 21/8455; H04N 21/2365; H04N 21/2665; H04N 21/4223; H04N 21/4347; H04N 21/4788; H04N 21/6543; H04N 5/445; H04N 7/15; H04N 21/854; H04N 21/8547
USPC .................................. 386/201, 248, 241, 242
See application file for complete search history.

(56) References Cited

U.S. PATENT DOCUMENTS

| | | | | |
|---|---|---|---|---|
| 8,437,409 | B2* | 5/2013 | Scherlis | H04N 21/235 370/350 |
| 8,892,079 | B1* | 11/2014 | Nace | H04N 7/147 455/414.2 |
| 2005/0117073 | A1* | 6/2005 | Payne | G06F 3/0304 348/744 |
| 2008/0019662 | A1* | 1/2008 | Scherlis | G11B 27/034 386/278 |
| 2009/0319482 | A1* | 12/2009 | Norlander | G06F 17/30817 |
| 2011/0162002 | A1* | 6/2011 | Jones | G06Q 30/02 725/32 |
| 2012/0063743 | A1* | 3/2012 | Bratton | H04N 21/4307 386/248 |
| 2014/0133836 | A1* | 5/2014 | Burns | G11B 27/10 386/278 |
| 2015/0009184 | A1* | 1/2015 | Baker | H04N 5/2621 345/175 |
| 2015/0103179 | A1* | 4/2015 | Galvin | H04N 5/247 348/159 |
| 2015/0222682 | A1* | 8/2015 | Lewis | G09B 5/00 715/719 |
| 2016/0210998 | A1* | 7/2016 | Leske | G11B 27/031 386/278 |

* cited by examiner

*Primary Examiner* — Helen Shibru
(74) *Attorney, Agent, or Firm* — Perkins Coie LLP

(57) ABSTRACT

Systems and methods are provided for generating a multi-stream composite video. A first mobile device is linked with a second mobile device so that the first mobile device and the second mobile device are time synchronized. A video stream is captured using the first mobile device. Interactions with a user interface are captured using the second mobile device. A composite video is generated based on the captured video stream and the captured interactions based on the time synchronization of the first mobile device and the second mobile device.

18 Claims, 9 Drawing Sheets

US 9,472,238 B2

SYSTEMS AND METHODS FOR LINKED MOBILE DEVICE CONTENT GENERATION

CROSS REFERENCE TO RELATED APPLICATIONS

This application claims priority to U.S. Provisional Patent Application No. 61/952,215, filed Mar. 13, 2014, entitled "Systems and Methods for Linked Mobile Device Content Generation," the entirety of which is herein incorporated by reference.

FIELD

This disclosure is related generally to video generation and more particularly to multi-source composite video generation using linked mobile devices.

BACKGROUND

It is often desirable to capture video of a person giving a presentation. For example, it is common to videotape a presenter giving a slide presentation at a conference so that those who were not able to attend the conference are able to view the presentation at a later time. Such videotaping can be sub-optimal for a number of reasons. For example, when a presenter and slides are videotaped in the same frame, it is often difficult to view the slides. Further, use of dedicated videotaping equipment for performing such videotaping can be expensive.

SUMMARY

Systems and methods are provided for generating a multi-stream composite video. A first mobile device is linked with a second mobile device so that the first mobile device and the second mobile device are time synchronized. A video stream is captured using the first mobile device. Interactions with a user interface are captured using the second mobile device. A composite video is generated based on the captured video stream and the captured interactions based on the time synchronization of the first mobile device and the second mobile device.

DETAILED DESCRIPTION

Figure 1:
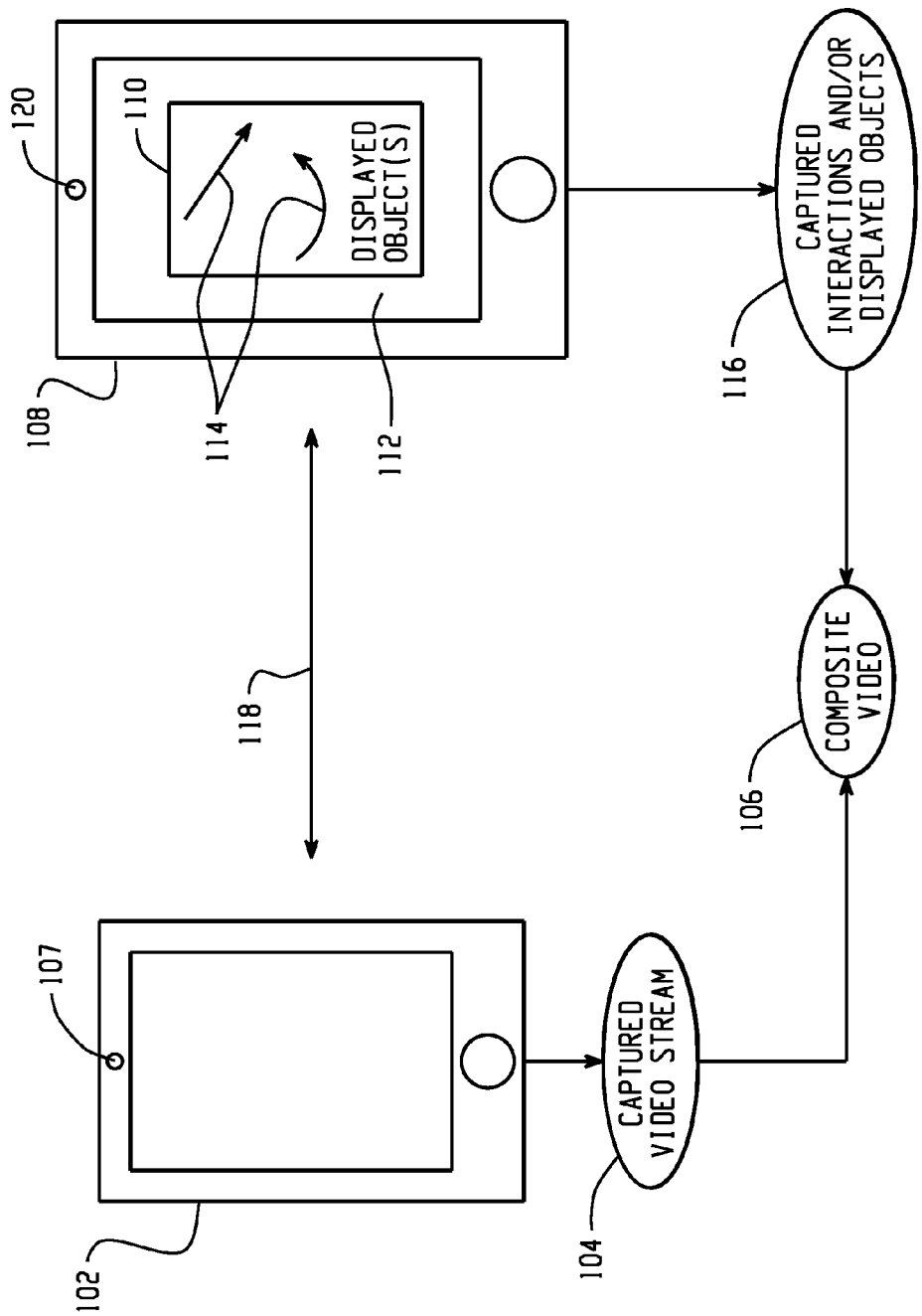
FIG. 1 is a block diagram depicting a multi-device system for generating a composite video.

FIG. 1 is a block diagram depicting a multi-device system for generating a composite video. The system includes a first device 102 that is configured to capture a video stream 104 for incorporation into a composite video 106 via a camera 107. A second device 108 captures objects 110 displayed on a display 112 of the second device 108 as well as user interactions 114 with those objects 110. The captured interactions and/or record of displayed objects 116 are further transmitted for incorporation into the composite video 106. The first device 102 and the second device 108 are time synchronized at 118, such that the composite video 106 can be generated while maintaining context between the captured video stream 104 and the captured interactions and displayed objects 116 easily.

The devices 102, 108 can be time synchronized via a variety of mechanisms. For example, the devices can be time synchronized via communication with one another. For example, each of the devices can be equipped with a software application that is configured to communicate with another device via near field communications (e.g., a device tap operation). The devices 102, 108 can further be synchronized via independent communications with an external computing system, such as an external server. In the example of FIG. 1, the devices 102, 108 are paired and synchronized with one another based on bringing the devices 102, 108 within close proximity with each other (e.g., via automatic detection of such proximity, via a user proximity scan request). For example, one of the device's clocks can be selected as the master clock, and both devices 102, 108 can calculate the difference between their clock and the master clock. That device's associated captured data 104 or 116 can then have timing data appended based on the master clock time, such as via a master clock synchronized timeline.

The system of FIG. 1 can be utilized in a variety of contexts. For example, the system of FIG. 1 can be used to generate a composite video that can support simultaneous display of video of a presenter as well as presentation materials associated with the presentation. The system can further capture interactions with the presentation materials, including user annotations to the presentation materials during the presentation, transitions from one slide to another, as well as other interactions. Such an implementation has several advantages over traditional videotaping of a presenter and a projection screen displaying presentation materials. First, the system of FIG. 1 includes a device that is dedicated to recording the presentation materials and interactions therewith. The system of FIG. 1 can avoid one cycle of digital-to-audio-transmission-audio-to-digital conversion that often greatly diminishes traditional recording quality.

Further, the system of FIG. 1 can provide a low cost option for generating a composite video, where the components 104, 116 can be captured via widely distributed multi-purpose devices. For example, each of the first device 102 and the second device 108 can be implemented using mobile user devices such as smart phones (e.g., iPhones, Droid-based phones) or tablet computers (e.g., iPad). Many of such devices include cameras 107 capable of capturing reasonably high quality video. Further, the operations of such devices are highly customizable through the use of downloadable applications (apps) that can facilitate synchronization of the first and second devices, capture of video 104, display of objects 110, and capture of interactions 114 with the displayed objects 110.

Additionally, the system of FIG. 1 can simultaneously capture the displayed objects and captured interactions 116 along with the captured video stream 104 using the first device 102 as a video capture mechanism that is dedicated to capturing the presenter, without the need to capture the presentation materials using the first device camera 107. Such a configuration enables capture of the presenter from a best angle while still capturing the full scope of the content.

Figure 2:
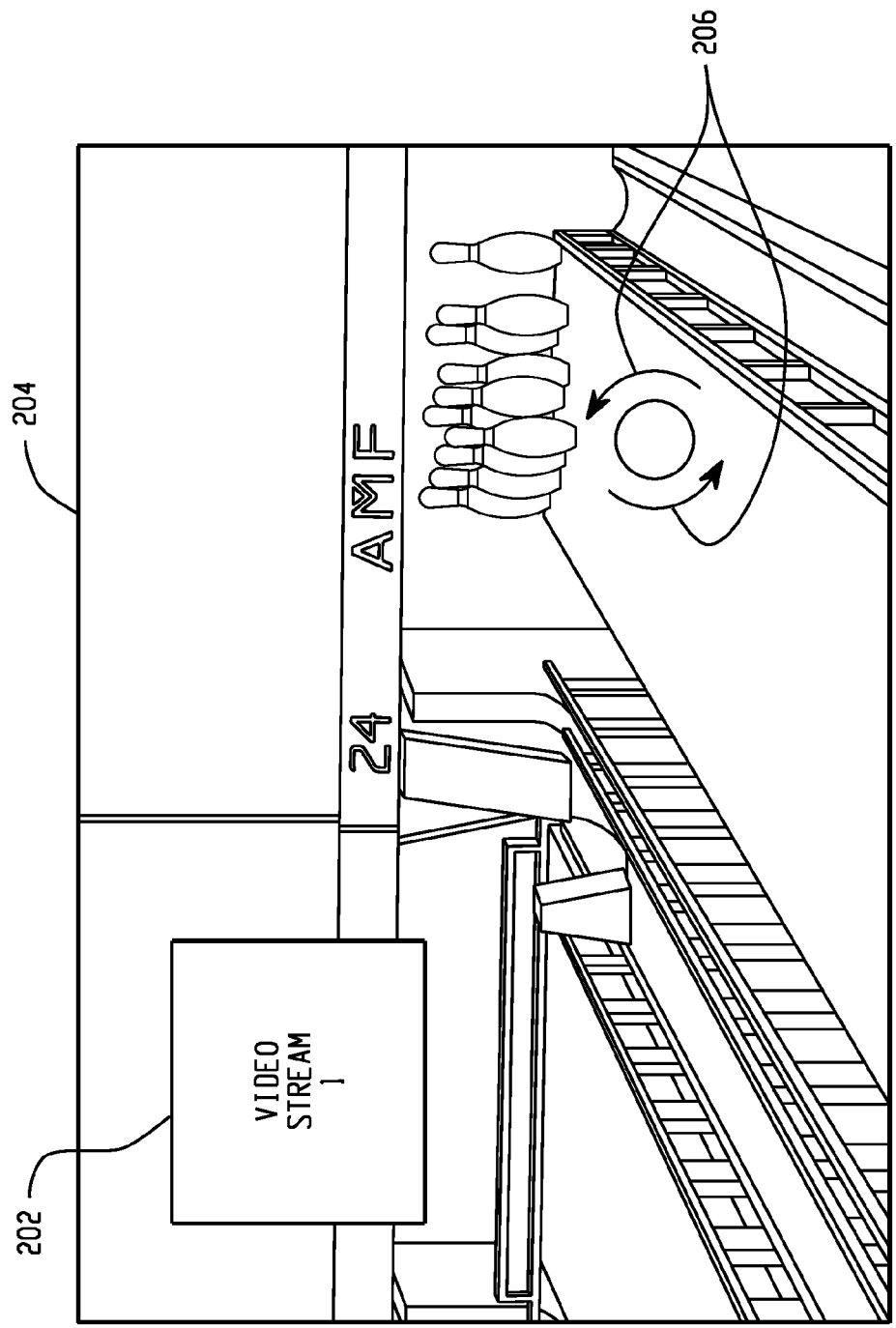
FIG. 2 depicts an example composite video display generated using the system of FIG. 1.

FIG. 2 depicts an example composite video display generated using the system of FIG. 1. The composite video includes presentation materials 204 and interactions therewith captured by the second device along with a captured video stream overlay 202 captured by the first device. In the example of FIG. 2, the presenter, depicted in the video stream 202 is discussing physics associated with bowling as part of a college curriculum. The presentation materials 204 at some points of the composite video display a video of a ball rolling down a bowling lane. At the point depicted in FIG. 2, the video at 202 is paused, and user annotations 206, captured from the second device, are displayed which describe how the spin of the ball guides it into the pocket of the pins for best results. The displayed objects that are capturable from the second device can take a variety of forms including Power Point presentation slides, images, video, web browser contents, and documents. Interactions can include transitions from one displayed object to another (e.g., Power Point slide transitions), movement of displayed objects around the display of the second device (e.g., movement of graphic objects of a flow diagram), and annotation on top of displayed objects (e.g., annotations to a still frame or playing video). The captured interactions and/or displayed objects are displayed in one region of the composite video, while the captured video stream from the first device is displayed in a second region of the video simultaneously for at least a portion of the composite video.

Figure 3:
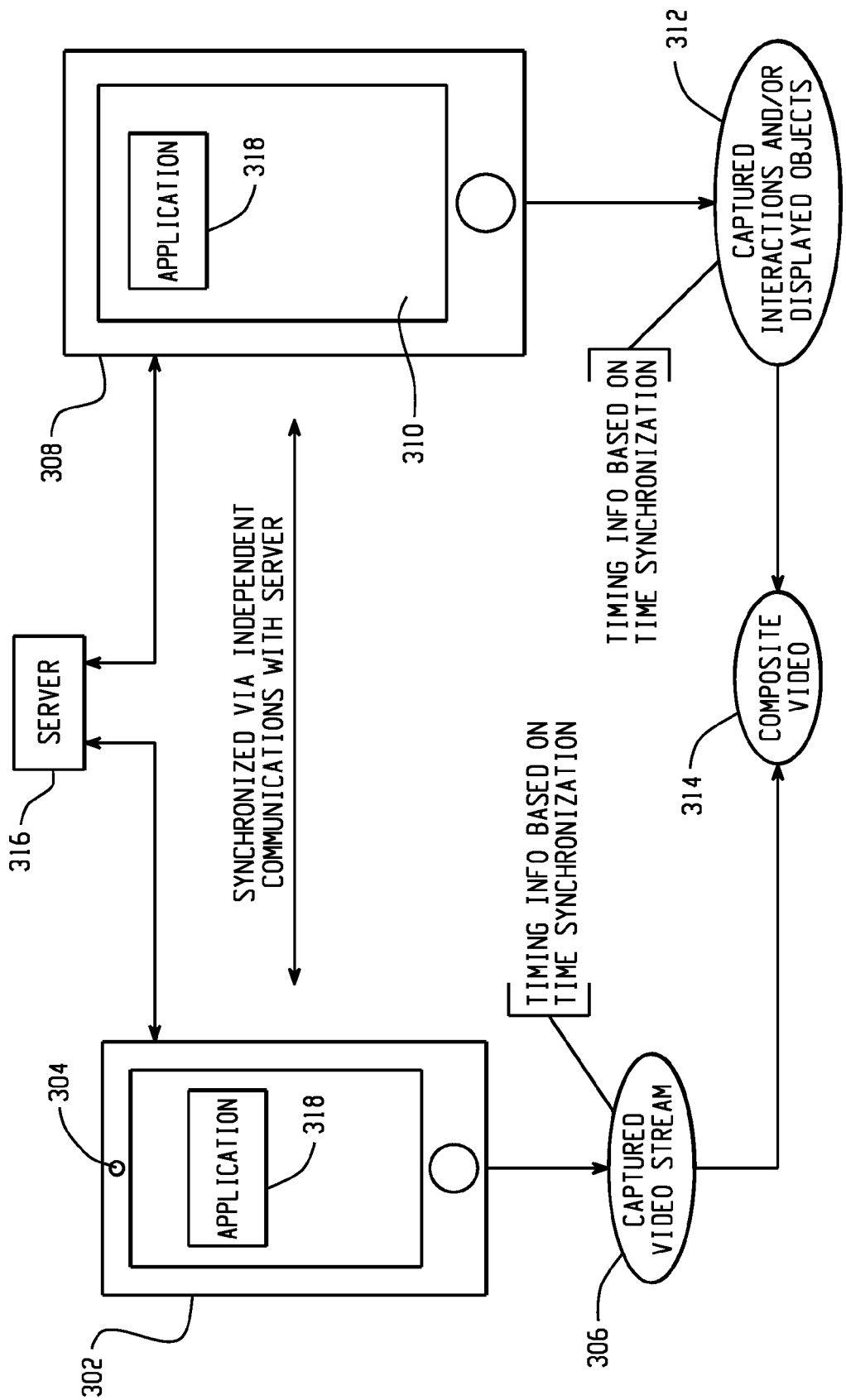
FIG. 3 is a block diagram depicting a second example configuration for synchronizing devices for capturing components for a composite video.

FIG. 3 is a block diagram depicting a second example configuration for synchronizing devices for capturing components for a composite video. A first device 302 includes a camera 304 for capturing a video stream 306 that includes timing data that is based on synchronization with a second device 308. The second device 308 is configured to capture objects displayed on its interface display 310 as well as interactions with those displayed objects, which are transmitted from the second device 308 along with timing information that is based on the synchronization at 312. The captured video stream 306 and the captured interactions and displayed objects 312 and their associated timing information are used to generate a composite video 314. In the example of FIG. 3, the first device 302 and the second device 308 are synchronized via communications with an external server computer 316, such as via applications 318 running on each of the devices 302, 308. For example, the server 316 can provide a current master time to each of the devices 302, 308. The devices can calculate a difference between their clocks and the master clock. Each device's associated captured data 312, 314 can then have timing data appended based on the master clock time, such as via a master clock synchronized timeline.

Figure 4:
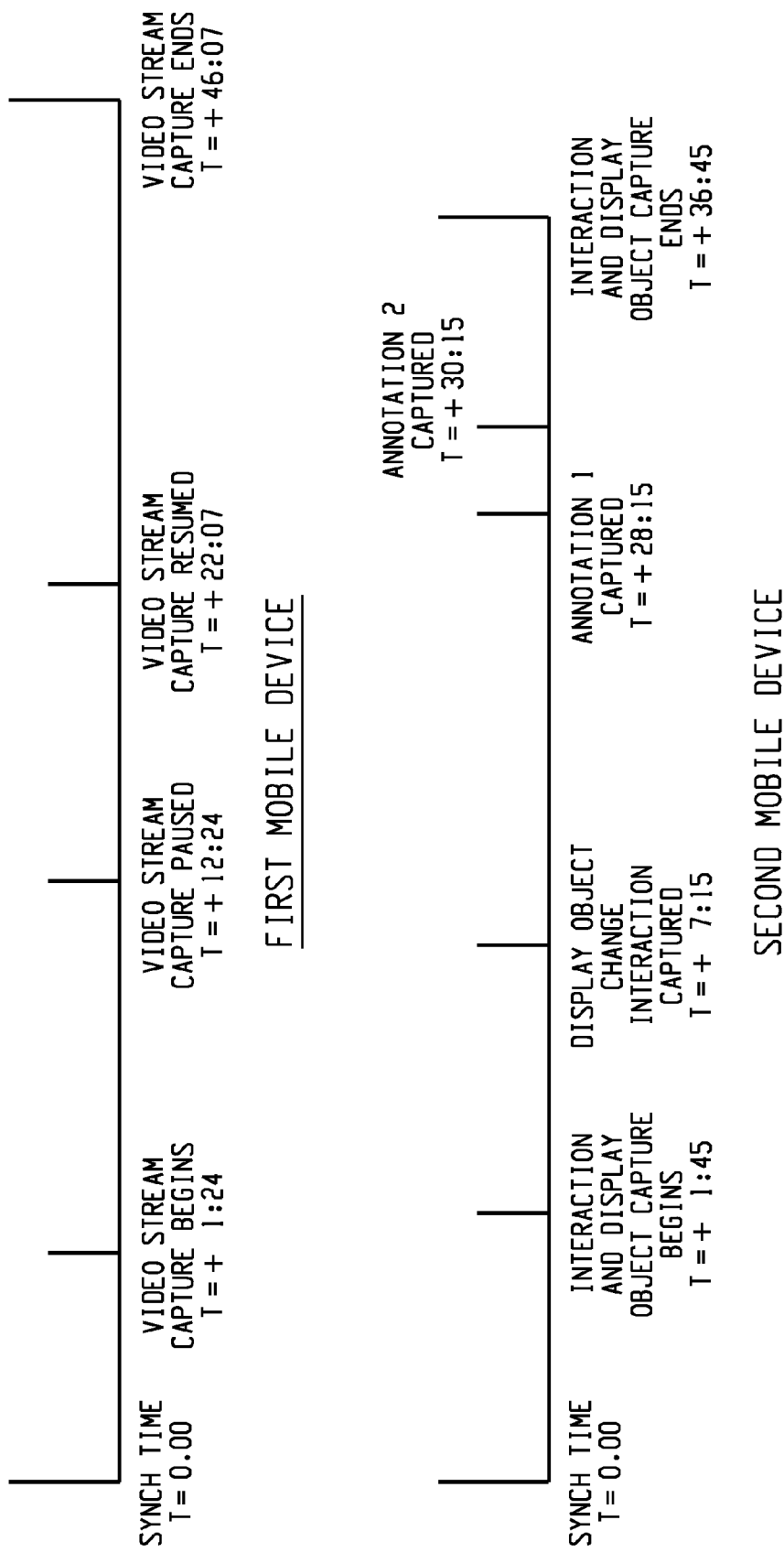
FIG. 4 is a diagram depicting example synchronization timelines generated by the first and second devices.

FIG. 4 is a diagram depicting example synchronization timelines generated by the first and second devices. The top timeline is generated by the first mobile device that is capturing a video stream, and the bottom timeline is generated by the second mobile device that is capturing displayed objects and user interactions. The devices are synchronized at T=0:00, such that the two timelines are time aligned. At T=1:24, video capture begins at the first device, and interaction and display object capture begins at the second device at T=1:45. At T=7:15, a change to the objects being displayed on the second device is captured. At T=12:24, the video capture is paused at the first device. At T=22:07, video capture at the first device resumes. A first annotation to the displayed objects is captured at the second device at T=28:15, and a second annotation is captured at T=30:15. Interaction and display object capture is halted at T=36:45 on the second device, and the video stream capture on the first device is halted at T=46:07. The captured video stream, along with first timeline data is transmitted from the first mobile device to a server or other device that will generate the composite video. The captured displayed objects and interactions therewith are also transmitted along with second timeline data. In one example, one of either the first or second devices is used to generate the composite video.

Figure 5:
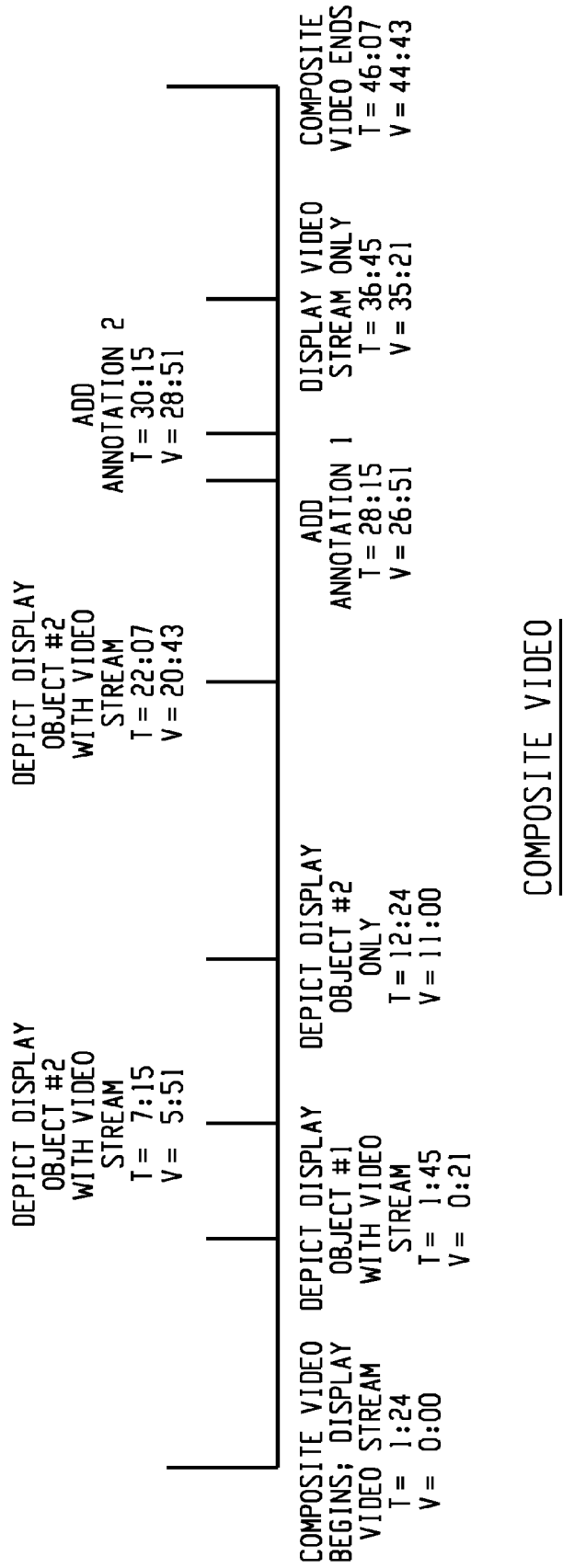
FIG. 5 depicts a composite video timeline generated based on a received captured video stream with first timeline data and captured interactions/displayed objects with second timeline data.

Using the timeline data received from the first and second devices, an entity generating the composite video is able to generate that composite video having synchronized display of video, objects, and/or annotations with ease. FIG. 5 depicts a composite video timeline generated based on a received captured video stream with first timeline data and captured interactions/displayed objects with second timeline data. The composite video begins at V=0:00, which corresponds to T=1:24, where the first device began capturing video, indicating the beginning of the presentation. At V=0:00, the composite video displays video from the first device of the presenter speaking At V=0:21, corresponding to T=1:45 on the device timelines, object 1 is displayed as part of the composite video. At V=5:51, object 2 is displayed as part of the composite video, based on the capture of object 2 being displayed on the second device at T=7:15. At V=11:00, the composite video is adjusted to show only object 2 without the speaker video based on the pause of video capture at T=12:24. The speaker video is again incorporated into the composite video at V=20:43 based on the corresponding resumption of video capture at T=22:07. Annotations are added over the display of object 2 in the composite video at V=26:51 and V=28:51 based on captures of corresponding annotations at T=28:15 and T=30:15, respectively, at the second device. At V=35:21, the composite video is adjusted to show only video based on the halting of object and interaction capture at the second device at T=36:45, and the composite video is ended at V=44:43 in accordance with video stream capture ending at T=46:07.

Figure 6:
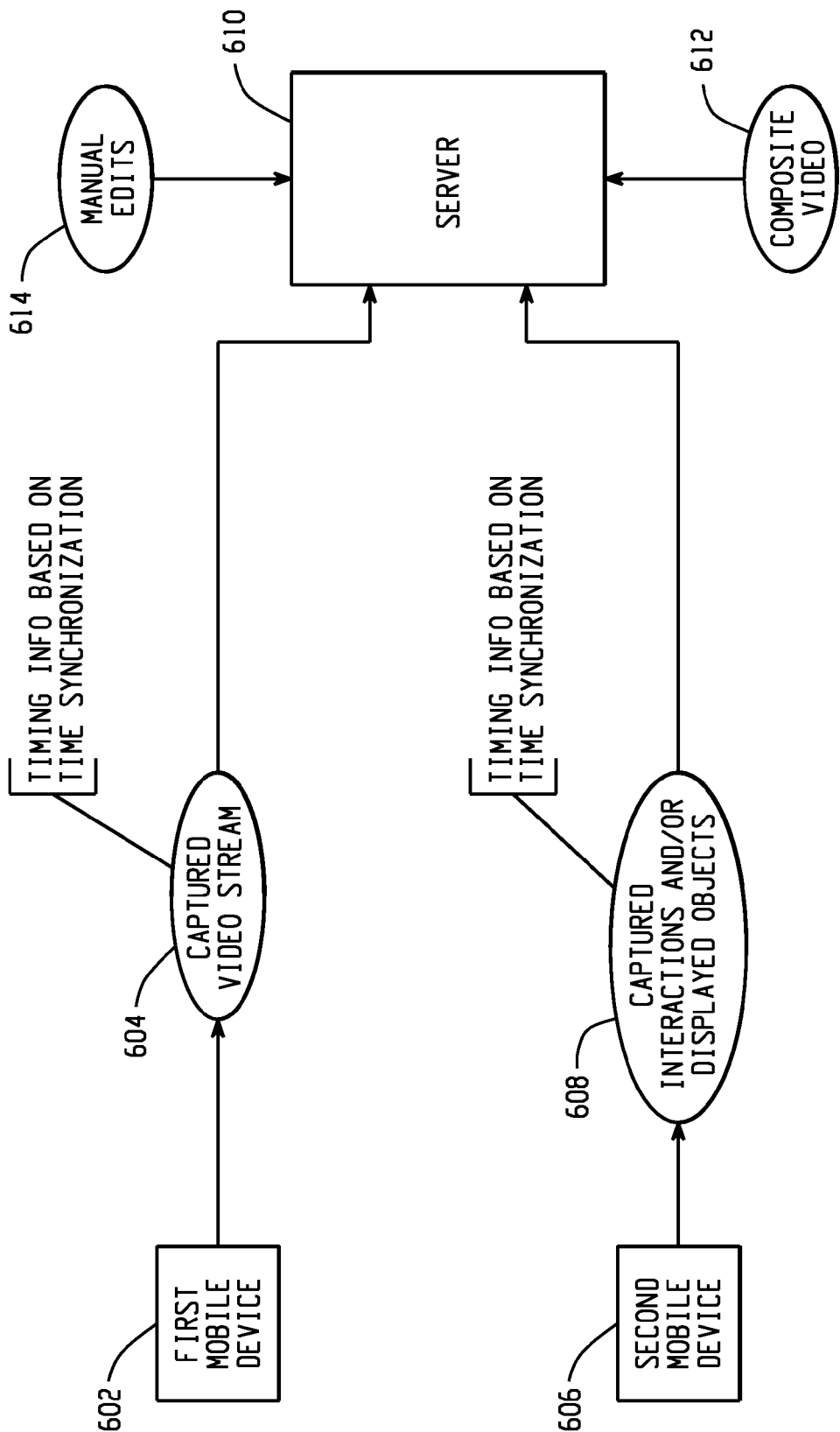
FIG. 6 is a block diagram depicting a system for generating a composite video.

FIG. 6 is a block diagram depicting a system for generating a composite video. A first mobile device 602 captures a video stream 604. A second mobile device 606 captures objects displayed on an interface of the second mobile device along with interactions with and annotations to such objects at 608. The first mobile device 602 and the second mobile device 606 are synchronized such that the captured video stream 604 and the object/interaction data 608 are transmitted with timing info that is based on the synchronization to a server 610. The server 610 generates a composite video 612 based on the received content data 604, 608, where that composite video includes at least a portion having simultaneous display of video from the captured video stream 604 and objects/interactions from 608 that are time aligned based on the synchronized timing info. The composite video 612 may also utilize certain manual edits 614 in generation.

Figure 7:
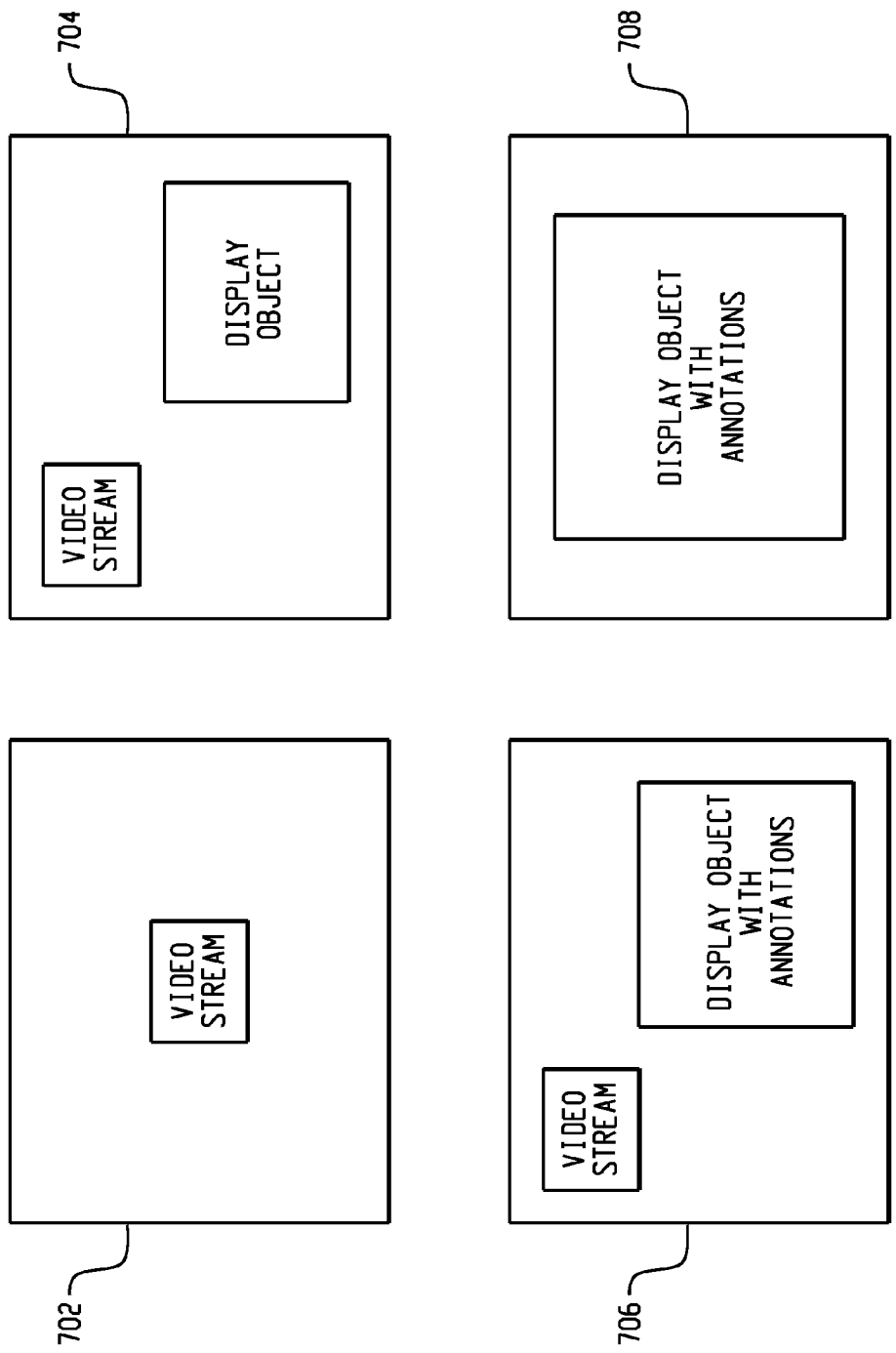
FIG. 7 is a diagram depicting example frame configurations for a composite video.

FIG. 7 is a diagram depicting example frame configurations for a composite video. At 702, a portion of the composite video is shown where the video stream is depicted alone. Such a configuration could correspond to V=0:00-V=0:21 of the composite video timeline of FIG. 5, where the presenter provided an introduction to the presentation. At 704, the video stream captured from the first device is depicted at one portion of the screen, while an object that was displayed on the second device is depicted at a second portion of the screen of the composite video. Such a configuration could correspond to V=0:21-V=11:00 of the FIG. 5 timeline. At 706, the video stream from the first device is displayed in a first portion of the composite video display while an object with overlaid captured annotations is depicted in a second region of the composite video. Such a configuration could correspond to V=26:51-V=35:21 of the FIG. 5 timeline. At 708, the object with annotations, as depicted on and captured by the second device is displayed without corresponding video from the first device.

Figure 8:
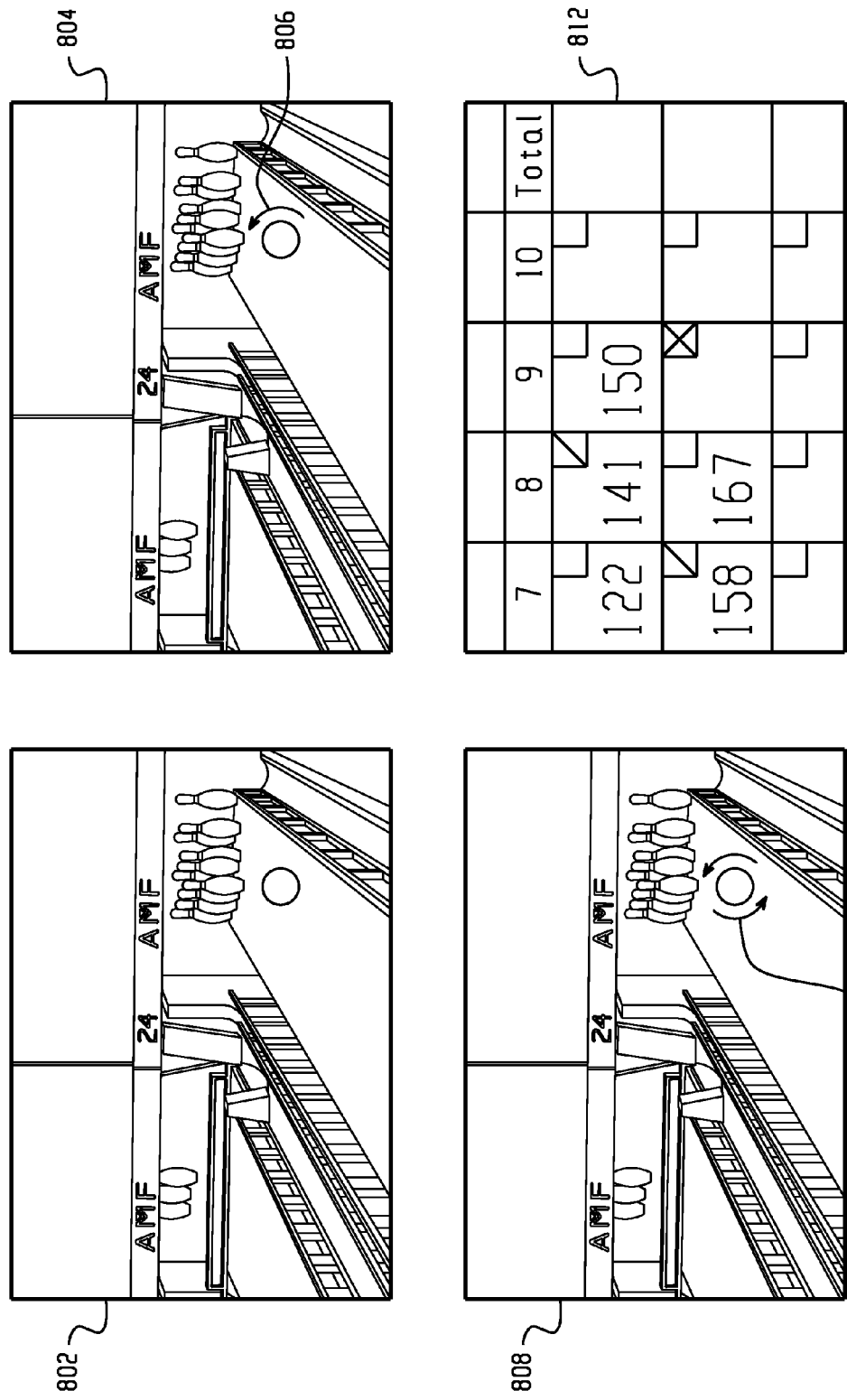
FIG. 8 depicts example object displays on the second device and corresponding interactions for capture.

FIG. 8 depicts example object displays on the second device and corresponding interactions for capture. At 802, a video of a bowling ball rolling down a lane is depicted on the second device. The second device captures the display of video and annotates its timeline accordingly. At 804, the video is paused, and the second device captures that interaction with the second device display. The second device further captures the user interacting with the display of the second device to add an arrow annotation 806 showing the desired direction of the ball. At 808, the second device captures a second user annotation 810 to the displayed object in the form of a second arrow indicating a direction of spin of the bowling ball. The second device stores an indication of that second annotation and updates its synchronized timeline accordingly. At 812, the second device captures an interaction with the display where the user commands display of a different object, a display of a bowling score sheet.

Figure 9:
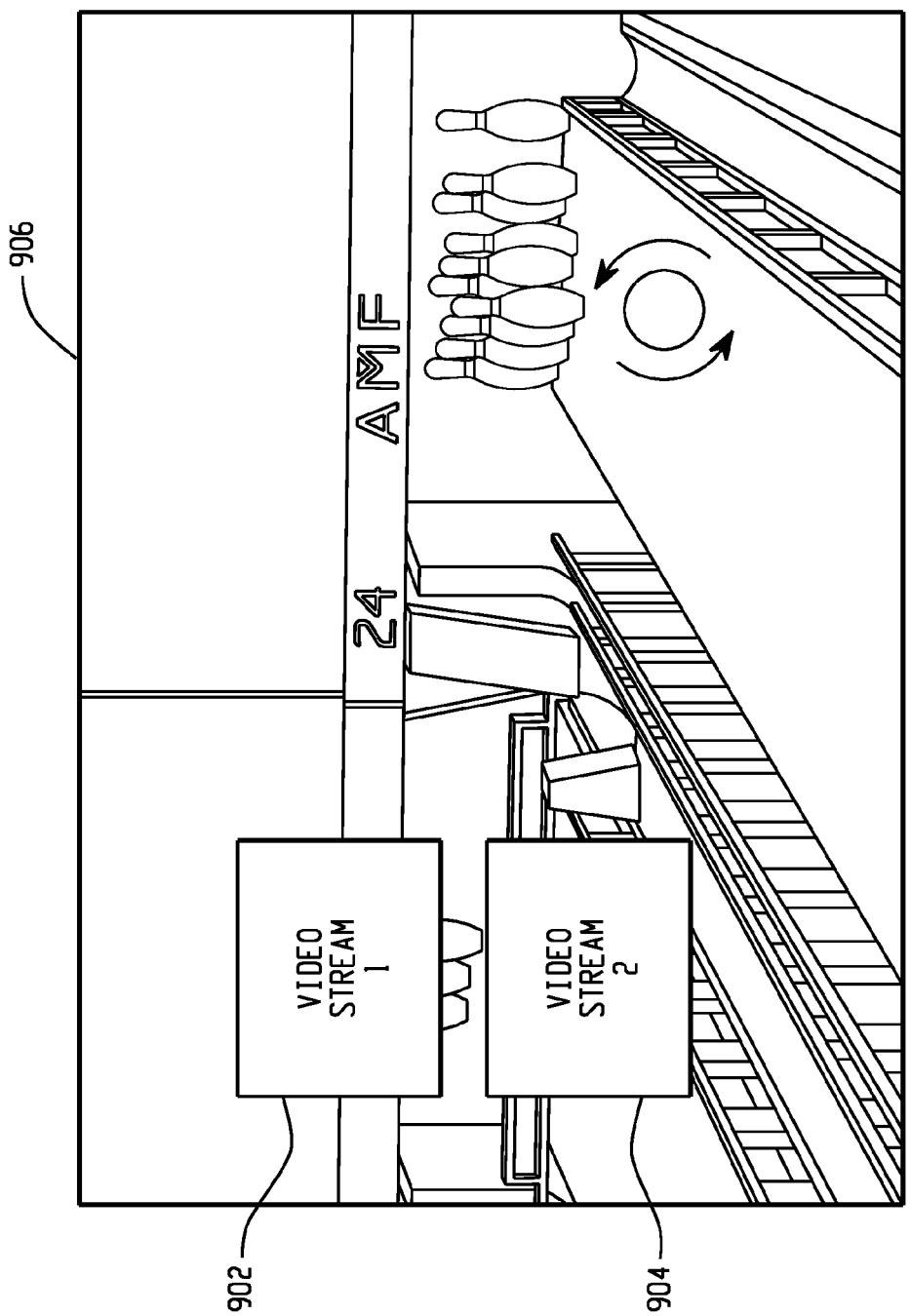
FIG. 9 depicts a first video stream 902 and a second video stream 904 overlaid on an object 906 displayed on the second device along with annotations thereto.

This application uses examples to illustrate the invention. The patentable scope of the invention includes other examples. For example, the systems described herein can generate a composite video that includes multiple video streams simultaneously, as depicted in FIG. 9, where a first video stream 902 and a second video stream 904 are overlaid on an object 906 displayed on the second device along with annotations thereto. Such a composite video configuration could be generated using the hardware described herein, such as by utilizing the camera 107 of the first device as well as a camera 120 of the second device, depicted in FIG. 1, to capture synchronized video for video stream 1 902 and video stream 2 904, respectively, where the camera 120 of the second device captures video from a different vantage point than the camera 107 of the first device.

It is claimed:

1. A processor-implemented method of generating a multi-stream composite video, comprising:
    linking a first mobile device with a second mobile device so that the first mobile device and the second mobile device are time synchronized;
    capturing a video stream of an event using the first mobile device and first timing information derived from the first mobile device and associated with the video stream, the video stream captured without sharing the video stream with the second mobile device;
    capturing objects displayed on the second mobile device during the event, user interactions with the displayed objects using the second mobile device, and second timing information derived from the second mobile device and associated with the display of objects and user interactions;
    correlation the captured video stream, display objects, and user interactions based on the captured first and second timing information and the time synchronization of the first mobile device and the second mobile device; and
    generating a composite video based on the correlated captured video stream, display objects, and user interactions.

2. The method of claim 1, wherein the composite video includes a simultaneous display of the video stream, the displayed objects, and a representation of the captured user interactions.

3. The method of claim 2, wherein the composite video includes a first frame that displays the video stream containing a person making a presentation and a second frame that displays the captured objects, corresponding to presentation materials, transformed based on the captured interactions.

4. The method of claim 3, wherein the transforming of the objects includes a selection of a presentation image or a traversal of a series of presentation images.

5. The method of claim 1, wherein the video stream is captured according to a first timeline, wherein the objects and user interactions with the objects are captured according to a second timeline, wherein the first timeline and the second timeline are aligned based on the time synchronization.

6. The method of claim 5, wherein the composite video simultaneously displays a portion of the video stream and a display based on a portion of the captured objects and user interactions that corresponds with the portion of the video stream using the aligned first timeline and second timeline.

7. The method of claim 1, wherein the objects displayed include an image, a series of images, a screen capture, web browser content, or a video.

8. The method of claim 1, wherein the objects include slides of a presentation.

9. The method of claim 1, wherein the captured interactions include annotations on a particular object of the objects displayed on the second mobile device.

10. The method of claim 9, wherein the composite video includes a simultaneous display of the particular object displayed on the second mobile device and the annotations to the object indicated by the captured interactions.

11. The method of claim 1, wherein the video stream includes video of a person delivering a presentation.

12. The method of claim 1, further comprising:
    capturing a second video stream using the second mobile device, wherein the second mobile device captures the second video stream from a different point of view than the first mobile device captures the video stream.

13. The method of claim 1, wherein the first mobile device and the second mobile device are linked using applications operating on each of the first mobile device and the second mobile device.

14. The method of claim 13, wherein the applications communicate with a server, wherein the first mobile device and the second mobile device are time synchronized based on one or more signals received from the server.

15. The method of claim 13, wherein the first mobile device and the second mobile device are automatically linked by being brought within proximity of one another.

16. The method of claim 1, further comprising:
    transmitting the video stream to a server along with first timing data that is based on the time synchronization;
    transmitting the captured displayed objects and user interactions to the server along with second timing data that is based on the time synchronization;

wherein the composite video is generated at the server using the first timing data and the second timing data.

17. A processor-implemented method of generating a multi-stream composite video, comprising:
receiving a video stream of an event captured using a first mobile device, the video stream having associated first timing information derived from the first mobile device, the video stream not being shared with a second mobile device;
receiving data associated with objects displayed on the second mobile device during the event, interactions of a user with the displayed objects captured using the second mobile device, and second timing information derived from the second mobile device and associated with the display of objects and user interaction, wherein the first mobile device and the second mobile device are linked so that the first mobile device and the second mobile device are time synchronized;
correlating the captured video stream, displayed objects, and user interactions based on the captured first and second timing information and the time synchronization of the first mobile device and the second mobile device; and
generating a composite video based on the correlated captured video stream, displayed objects, and user interactions.

18. A computer-implemented system for generating a multi-stream composite video, comprising:
one or more computer-readable mediums configured to store:
a video stream of an event captured using a first mobile device, the video stream having associated first timing information derived from the first mobile device, the video stream not being shared with a second mobile device; and
data associated with objects displayed on the second mobile device during the event, interactions of a user with the displayed objects captured using the second mobile device, and timing information derived from the second mobile device and associated with the display of objects and user interactions, wherein the first mobile device and the second mobile device are linked so that the first mobile device and the second mobile device are time synchronized; and
one or more data processors configured to perform operations that include:
correlation the captured video stream, displayed objects, and user interaction based on the first and second timing information and the time synchronization of the first mobile device and the second mobile device; and
generating a composite video based on the correlated captured video stream, displayed objects, and user interactions.

* * * * *